United States Patent [19]

Dodson

[11] Patent Number: 4,959,756
[45] Date of Patent: Sep. 25, 1990

[54] CHEMILUMINESCENT LIGHT ELEMENT DISPENSING AND ACTIVATING APPARATUS

[76] Inventor: James W. Dodson, 1115 Sheffield,, Bellaire, Tex. 77401

[21] Appl. No.: 324,603

[22] Filed: Mar. 15, 1989

[51] Int. Cl.$^5$ .............................................. F21K 2/00
[52] U.S. Cl. ..................................... 362/34; 252/700; 362/61; 362/234
[58] Field of Search ...................... 362/34, 253, 61.80; 116/DIG. 40; 252/700; 221/135, 232, 312 C, 247, 248, 249

[56] References Cited

U.S. PATENT DOCUMENTS

| | | | |
|---|---|---|---|
| 2,462,922 | 3/1949 | Temple | 116/DIG. 40 |
| 2,751,582 | 6/1956 | Kuykendall | 340/815 |
| 3,158,099 | 11/1964 | Dzvonik | 102/37.4 |
| 3,294,056 | 12/1966 | Gouger | 116/28 |
| 3,319,596 | 5/1967 | Walter | 116/63 |
| 3,511,612 | 5/1970 | Kennerly et al. | 252/700 |
| 3,539,794 | 11/1970 | McKay et al. | 362/34 |
| 3,576,987 | 5/1971 | Voight et al. | 362/34 |
| 3,597,362 | 8/1971 | Bollyky et al. | 252/186 |
| 3,612,857 | 10/1971 | Beatty | 252/700 |
| 3,628,416 | 12/1971 | Kernan | 102/37.4 |
| 3,736,874 | 6/1973 | Gerber | 362/34 |
| 3,752,082 | 8/1973 | Kernan | 102/37.4 |
| 3,788,222 | 1/1974 | Evans | 102/37.4 |
| 3,829,678 | 8/1974 | Holcombe | 362/34 |
| 4,069,761 | 1/1978 | Jimenez | 102/37.4 |
| 4,186,426 | 11/1980 | Ginpras, Sr. et al. | 362/34 |
| 4,751,616 | 6/1988 | Smithey | 362/34 |

Primary Examiner—Ira S. Lazarus
Assistant Examiner—D. M. Cox
Attorney, Agent, or Firm—Pravel, Gambrell, Hewitt, Kimball & Krieger

[57] ABSTRACT

A chemiluminescent light element dispensing and activating system for use with a vehicle is disclosed. The apparatus comprises a housing having an aperture that opens to the outside of the vehicle. A disposable holder is operatively releasably connected to the housing for containing and positioning a plurality of elements relative to this housing aperture. Each positioned element is dispensed after a chemical reaction is activated in the element to operably provide a chemiluminescent light.

Advantageously, an actuator, electrically coupled to a power source in the vehicle, contacts the top of the element by breaking a capsule within the element while urging the element through the housing aperture. Additionally, a quick connect means interengaged with the housing and the holder facilitates positioning and aligning of the plurality of signal elements relative to the housing aperture. A novel light element is disclosed for use with the dispensing and activating apparatus which allows activating of the light element upon impact by an actuator of the present invention.

17 Claims, 3 Drawing Sheets

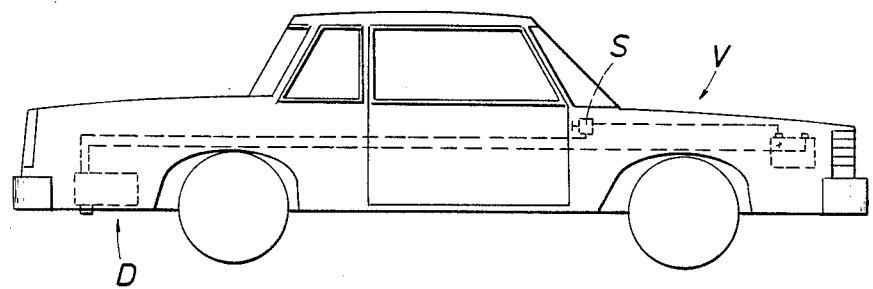
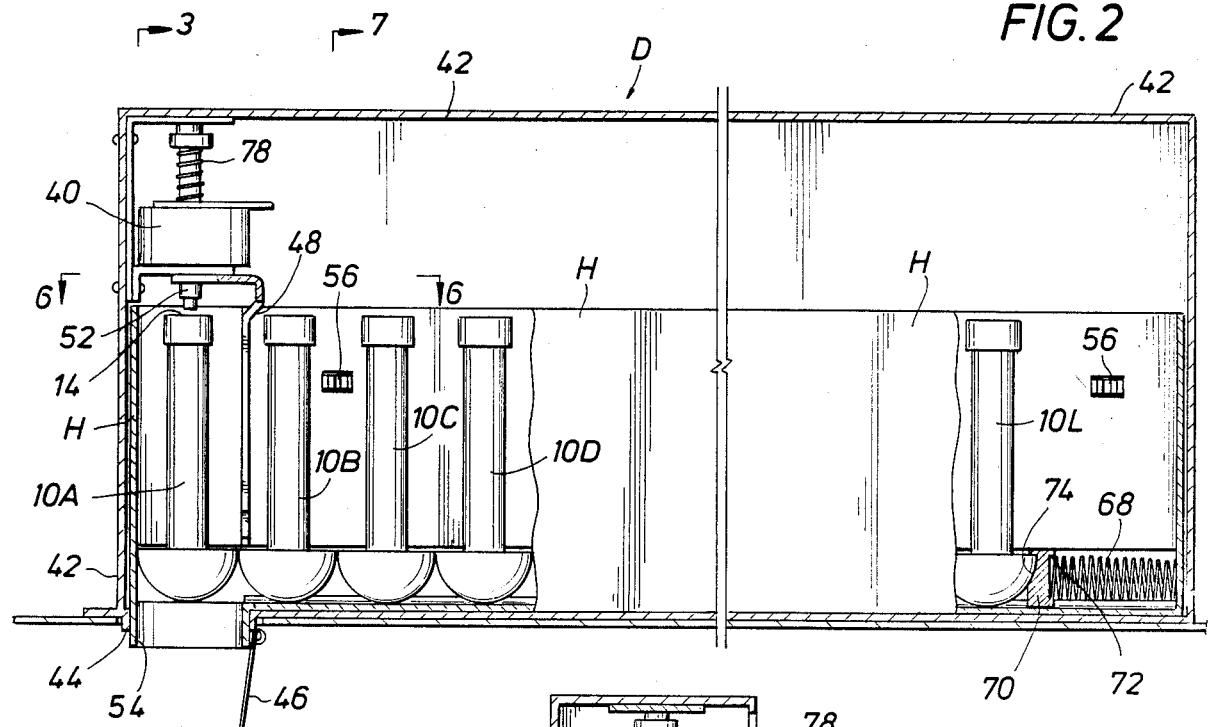
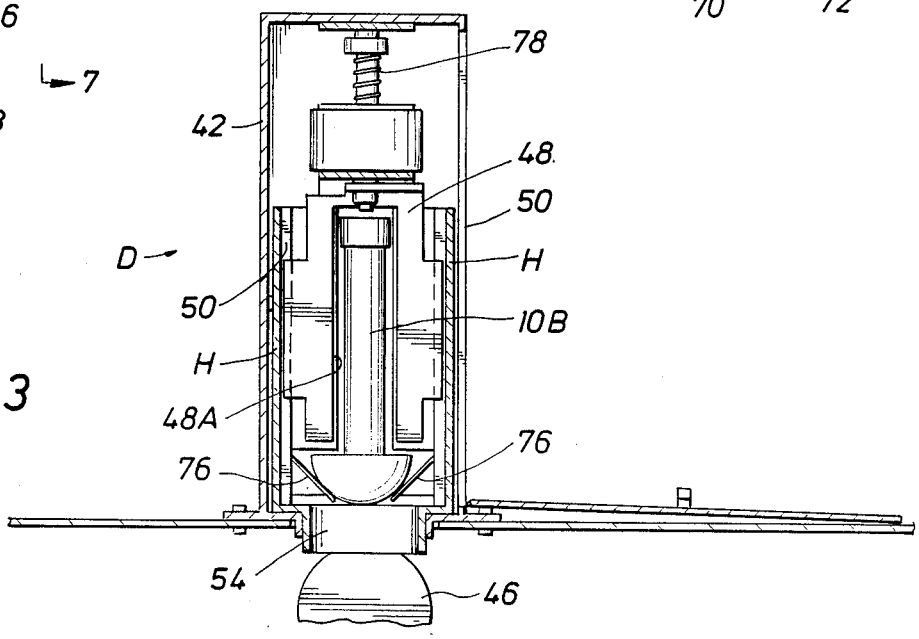

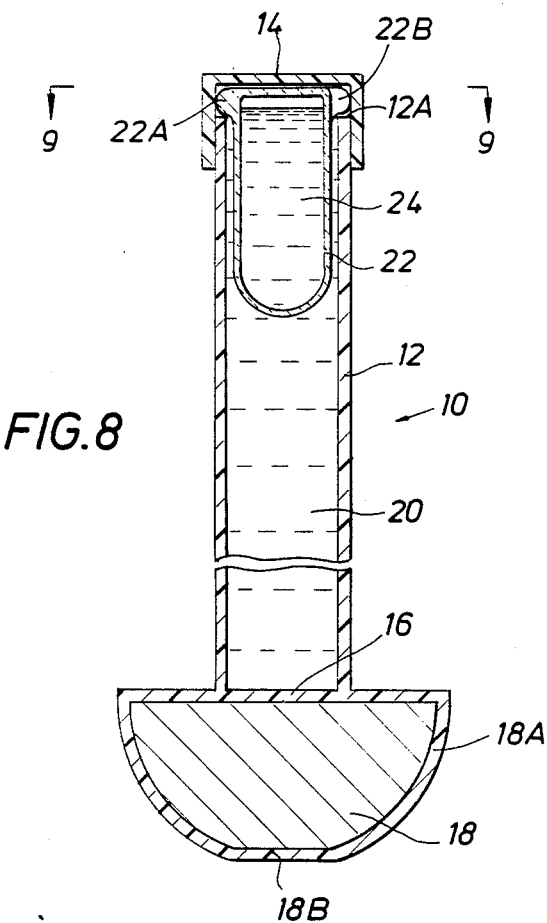
FIG. 8
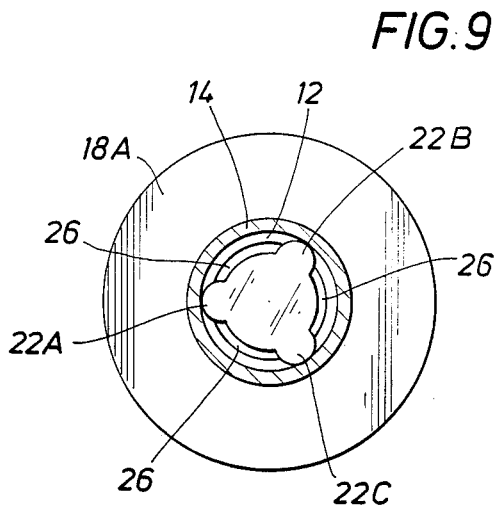
FIG. 9
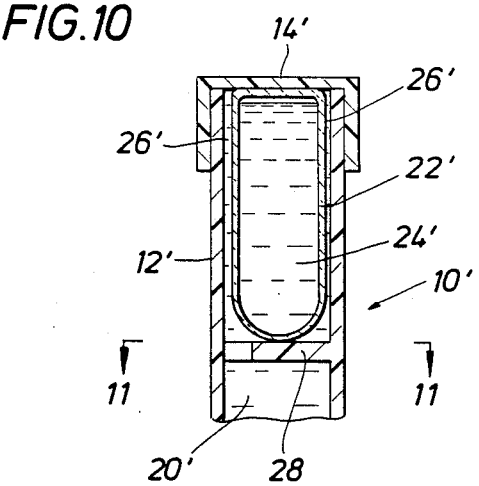
FIG. 10
FIG. 11
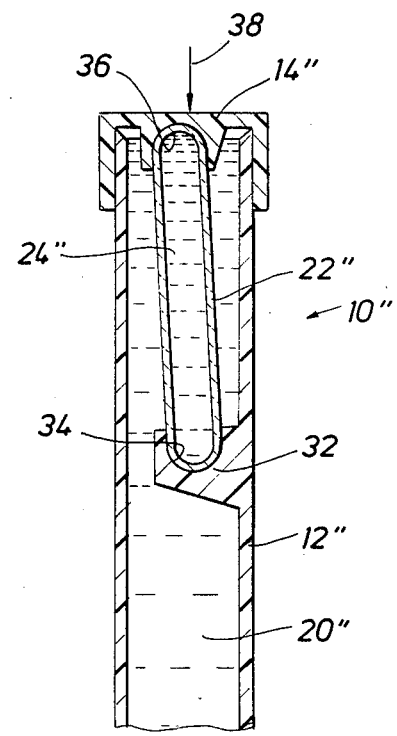
FIG. 12

CHEMILUMINESCENT LIGHT ELEMENT DISPENSING AND ACTIVATING APPARATUS

BACKGROUND OF THE INVENTION

1. Technical Field of the Invention

This invention relates to dispensing and activating a chemiluminescent light element particularly the invention relates to a dispensing mechanism having a disposable holder containing a plurality of chemiluminescent light elements.

2. Description of the Prior Art

Several types of dispensing mechanisms have been used in connection with igniting of a conventional flammable flare. Also, dispensing systems from vehicles have been proposed, as in U.S. Pat. Nos. 2,462,922; 2,751,582; 3,158,099; 3,294,0S6; 3,628,416; 3,752,082; 3,788,222 and 4,069,761. Additionally, dispensing devices for other signalling elements or devices such as sponge rubber having an illuminescent coating have been disclosed in U.S. Pat. No. 3,319,596. None of these U.S. patents are intended to be used by loading their signal devices using a disposable prepackaged holder containing the signal devices. U.S. Pat. No. 3,628,416 and its division U.S. Pat. No. 3,752,082 disclose a flammable fusee dispensing and igniting apparatus that includes a rotary turret or magazine for receiving a plurality of flares. A cover is provided for the magazine. An axial bore of the magazine is received on a stud extending from a plate. A bolt and washer is used to secure the magazine to this stud. The upper end of this same stud extends through an aperture in the cover and an additional nut is then used to secure the various components together.

Several types of positioning means have been used to prevent these flares from rolling off the road or to provide the best burning position or visual orientation. Of the patents discussed above, U.S. Pat. No. 2,462,922 discloses a spike at one end; U.S. Pat. No. 3,294,056 discloses a sandbag attached to the flare; U.S. Pat. No. 3,319,596 discloses the signal device base connected by a flexible cord to a flexible container filled with lead shot; and U.S. Pat. No. 4,069,761 discloses collapsible legs for positioning the dispensed lit flare.

Further, some of these devices, if they are ever to be reused, require complicated and intricate reassembly procedures if not also requiring new elements to rebuild the dispensing device such as a combustible disc 40 as disclosed in U.S. Pat. No. 2,751,582.

Several types of chemiluminescent light elements or lightsticks have been used in connection with emergencies. These lightsticks eliminate the fire hazard of ignitable lighting devices such as the fusees or flares disclosed above.

Such lightsticks have been manufactured by the American Cyanamid Company of Milton, Fla. These conventional lightsticks are designed for 8 to 12 hours of light and their uses include automotive accident markers, traffic control, and exit route markers. These lightsticks come in a number of different colors including red and green and comprise a plastic sealed cylinder having a chemical fluid and a floating rupturable capsule having another fluid therein. The actuation of these lightsticks requires bending the lightsticks to break or shatter the free floating capsule and then agitating the fluids to create light as is disclosed in U.S. Pat. No. 3,576,987.

U.S. Pat. No. 3,539,794 discloses a number of different self-contained chemiluminescent lighting devices including a translucent container having a divider wall which forms two separate compartments containing two different fluids. Pressure on a rod extending through a flexible cover displaces the divider wall to permit admixture of the fluids so as to provide a chemiluminescent light. In another embodiment, an inner container is closed by a cover having an attached rod which extends through the top of an outer container. The rod is pulled upwards which removes the cover from the inner container. Again the chemiluminescent fluids are admixed to form a chemiluminsecent light.

There has been a long-felt need for a chemiluminsecent light element dispensing and activating system which eliminates the use of a flammable fusee while providing a light element that is waterproof. Additionally, there has been a need to provide a disposable holder containing a plurality of lightsticks that can be easily inserted by the user after the original supply of lightsticks has been depleted.

Rollable push carts, as disclosed in U.S. Pat. No. 3,788,222, have been designed for use by a peace officer first arriving at the scene of a highway accident. Except for this rollable cart, all of the above patents illustrate dispensing means directed to seven or less signaling devices. A device that allows for a plurality of signal devices is especially desirable to a police officer who must dispense a large number of these devices at once. Such a device would allow dispensing a large number of signal elements without requiring the user to leave the vehicle. Then a full holder could quickly and easily be loaded at a safe location remote from any accident site. Therefore, a lightstick dispensing and activating apparatus simple to manufacture yet easy to install and operate for this purpose has been desired by the industry and consumers.

SUMMARY OF THE INVENTION

Briefly, according to the present invention, a chemiluminescent signal light element dispensing and activating system is provided for use with a vehicle. The apparatus comprises a housing having an aperture that opens to the outside of the vehicle. A disposable holder is operatively releasable connected to the housing for containing and positioning a plurality of signal elements relative to this housing aperture. Each dispensed signal element is activated to operably provide a chemiluminescent light.

Advantageously, an actuator means, electrically coupled to a power source in the vehicle, contacts the top of a positioned signal element to activate the signal element by breaking a capsule within the element before urging the positioned signal element through the housing aperture. Additionally, a quick connect means is interengaged with the housing and the holder to facilitate positioning and aligning of the plurality of signal elements relative to the housing aperture.

The above invention preferably uses a waterproof non-flammable chemiluminescent light element. A hydrogen peroxide solution and a fluorescent compound is provided in the signal element casing along with a breakable or rupturable capsule. The capsule, which includes a chemiluminescent compound in a diluent, is fixedly mounted at the top end of the casing to operably enable activation of the element.

BRIEF DESCRIPTION OF THE DRAWINGS

The objects, advantages and features of the invention will become more apparent by reference to the drawings which are appended hereto, wherein like numerals indicate like parts, wherein an illustrated embodiment of the invention is shown, of which:

FIG. 1 discloses wiring of the present invention relative to a vehicle where the present invention is shown positioned in the trunk of the vehicle.

FIG. 2 is an enlarged broken elevation view of the present invention showing the disposable holder in partial broken away view to expose positioning of the signal elements of the present invention.

FIG. 3 is a section view taken along lines 3—3 of FIG. 2.

FIG. 8 is an enlarged elevation section view of the preferred embodiment of the signal element of the present invention.

FIG. 9 is a section view taken along line 9—9 of FIG. 8.

FIG. 10 is a fragmentary view similar to FIG. 8 showing an alternative embodiment of the signal element of the present invention.

FIG. 11 is a section view taken along line 11—11 of FIG. 10.

FIG. 12 is another alternative embodiment of the signal element of the present invention.

DESCRIPTION OF THE PREFERRED EMBODIMENT

Figure 4:
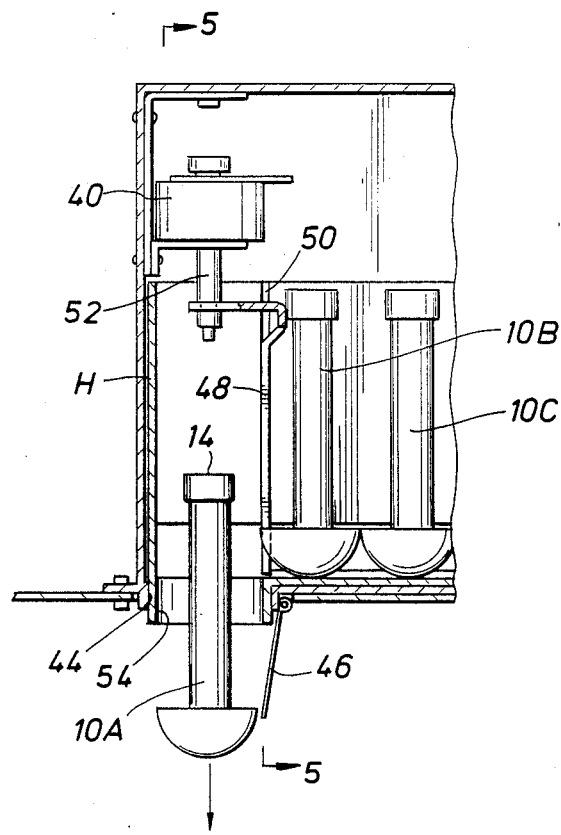
FIG. 4 is a fragmentary elevation view similar to FIG. 2 showing the activated signal element being dispensed from the vehicle.

In the drawings, a dispensing system D according to the present invention is shown for dispensing and activating a signal device or element 10 from a vehicle V. The element 10A moves from an activating position (FIG. 2) to a dispensed position (FIG. 4) after the element has been activated to provide a chemiluminescent light. Advantageously, device D includes a disposable holder H containing a plurality of these chemiluminescent light elements 10.

Turning now to the preferred embodiment of the chemiluminescent light as shown in FIG. 8, a waterproof non-flammable signal element adapted for use with the present invention is shown. The preferred embodiment of the element 10 includes a casing 12 preferably fabricated from a translucent or transparent plastic. The casing has a first flexible end 14 and a second end 16. A semi-spherical base 18 is attached as an integral unit with the element 10 at the second end 16 of the casing 12. This base 18 operably aids in the positioning of the signal element both while it is contained in the holder H and after the signal element has been dispensed from the vehicle V as will be explained below in detail. Preferably the base 18 is fabricated from lead having a plastic coating 18A thereon. Additionally the base 18 includes a flat portion 18B at the bottom of the base to aid in the vertical positioning of the element.

The casing 12 includes a fluid, preferably a hydrogen peroxide solution and a fluorescent compound and a capsule 22. The capsule 22 contains another fluid, preferably a chemiluminescent compound in a diluent 24 therein. The chemical composition of the light element is designed to provide a brighter and more intense light than provided in the conventional lightsticks manufactured by American Cyanamid Company of Milton, Fla. but could have a shorter light duration of approximately 3-4 hours. The conventional teachings of the chemical compounds used to provide this chemiluminescent light is disclosed in U.S. Pat. Nos. 3,539,794; 3,576,987 and 3,597,362. The disclosure of these U.S. patents are incorporated herein for all purposes including the fabrication of the structure of the light element 10. As best seen in FIGS. 8 and 9, the capsule 22 includes three tabs 22A, 22B and 22C positioned equi-distant about the top end of the capsule 22. As can be seen when the tabs 22 are positioned on the shoulder 12A of the casing 12, an annulus 26 is provided between the capsule 22 and the inner diameter of the casing 12 to allow mixture of the fluids 24 and 20 upon rupture of capsule 22. Preferably, capsule 22 is a rigid breakable or frangible material such as glass or a relatively brittle thermoset resin, e.g. thin walled bakelite or other suitable material and need not be transparent or translucent.

Referring now to FIG. 10, an alternative embodiment of the signal element of the present invention is shown and is referred to generally as 10'. In this alternative embodiment a plastic web portion 28, as best shown in FIG. 11, positions the capsule 22' adjacent to the flexible top end 14'. Additionally, an annulus 26' is provided between the capsule 22' and the casing 12' to allow mixture of the fluids. This mixture of fluid is further enabled by the ports 30 provided by the web 28 between three attachment fingers 31 of web 28, any number of fingers to allow mixture of the fluids could be used so long as sufficient ports are provided. Alternatively, a grill may be used if desired.

Referring now to still a further embodiment of the present invention, a casing 12" is provided with an inwardly extending projection 32 having a bore 34 to receive one end of capsule 22". The other end of capsule 22" is held within bore 36 in end 14" so that the top end of the capsule 22" is eccentrically positioned from the axis 38 of casing 12". Any impact loading at the axis 38 would provide a torquing of the capsule 22" to aid in the rupture of the capsule 22" to permit admixing of the fluids 24" and 20".

Returning now to FIGS. 1 and 2, the device D is shown positioned in the trunk of vehicle V and includes a conventional switch S to operate the actuator 40 of the present invention. The actuator 40 is positioned in a housing 42. The housing 42 is preferably fabricated from sheet metal to provide protection to the device in the rugged environment that exists within the trunk of the vehicle V. The housing 42 has a cylindrical opening 44 therein and includes a lid 46 hinged to the housing for closing the opening 44 when the device D does not contain a holder H.

Figure 5:
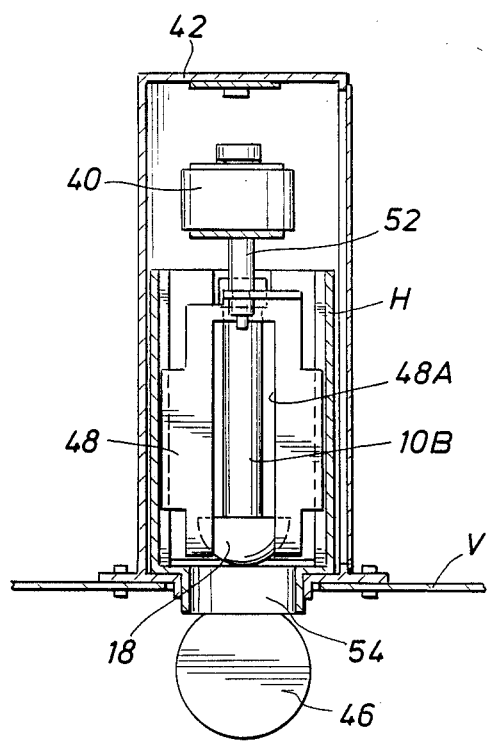
FIG. 5 is a section view taken along line 5—5 of FIG. 4.
Figure 6:
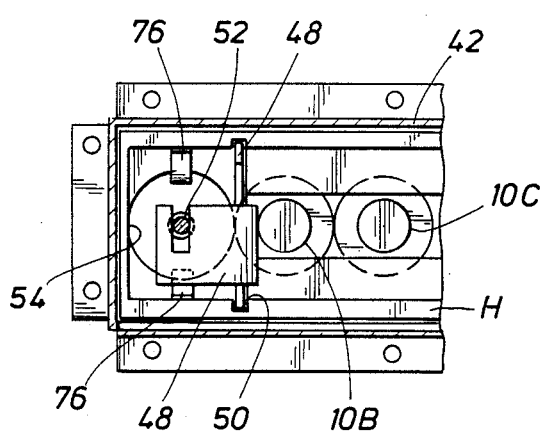
FIG. 6 is a section view taken along line 6—6 of FIG. 2 with the light element 10A removed.

As best shown in FIGS. 2, 3, 4, 5 and 6, the holder H includes a gate 48 disposed in the holder means for allowing the signal device 10A in the activating position to be dispensed from the vehicle V while maintaining the position of the other signal devices 10B through 10L. The gate 48 slides in slots 50 in the holder H, as best seen in FIGS. 4 and 6. The top portion of the gate 48 is interengaged with the stem 52 of the actuator means 40 when the holder H is connected to the housing 42. The configuration of the gate 48 is fabricated so that it allows the positioning of the marginal side portions of the gate within the slot 50 yet provides an opening 48A for casing 12 to move therethrough (FIG. 3). Though when the stem 52 is in its down activating position for impacting the top end 14 of the element 10, the gate 48 is moved to its maintaining position (FIG. 5) so that the lower end of the gate 48 blocks the base 18 of the element 10.

Figure 7:
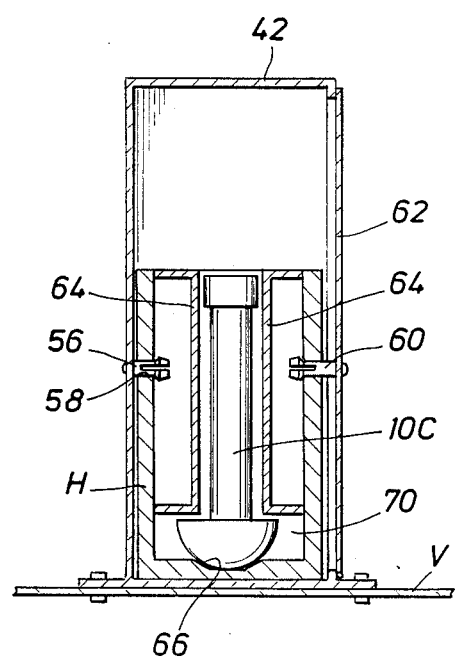
FIG. 7 is a section view taken along line 7—7 of FIG. 2.

When the holder is positioned in the housing, the cylindrical portion 54 of the holder extends through the opening 44 of the housing to maintain the lid 46 in the open position. Additionally, a plurality of quick connect means that include a tab 56 provided for being received in an opening 58 in the holder H. Tabs 56 are fixedly attached to the inside wall of the housing 42. Also shown, but not required, would be a plurality of quick connect means 60 secured to the cover 62 of the housing 42 which provides the function of positioning the holder within the housing and additionally maintains the cover 62 in the closed position, as shown in FIG. 7. It is contemplated that the number of quick connect means 56 on the one side of the housing could be fewer than the quick connect means 60 attached to the cover 62 so that upon opening the cover 62 the holder would release from the tabs 56 and would move along with the cover to facilitate removal of the holder from the device D.

Turning now to FIG. 7, guides 64 extend inwardly from the holder to align the light elements 10. An indention 66 in the bottom of the holder further provides guiding and cooperates with the flat 18B of the base 18, as best shown in FIG. 8, to reduce friction of the light element as it moves forward to the activating position. Teflon or high polishing of the contacting points of the element and the indention 66 may be used for further reducing friction.

Returning now to FIG. 2, it is seen that a compressed spring 68 in the holder H urges a travelling block 70 thereon, as best seen in FIGS. 2 and 7. The travelling block 70 has a slot 72 on one side for retaining the spring 40 therein and a notch 74 on the other side that corresponds to the configuration of the base 18 of a typical light element. The spring 68 has sufficient force to move the last element, in this case 10L, to the activating position above the opening 44.

The holder further includes a plurality of resilient leaf springs 76 disposed adjacent to the cylindrical portion 54 of the holder H for resisting the dispensing of the positioned signal device, in this case 10A, until the positioned signal device has been activated by impact of the actuator stem 52. It is to be understood that other resisting means could be used in place of leaf springs 76.

USE AND OPERATION

In the use and operation of the device, the user would push the switch S in the vehicle V causing an electric current to move the stem 52 of the solenoid or actuator means 40 from its at rest position, as shown in FIG. 2, to its extended impacting position, as shown in FIGS. 4 and 5. It is contemplated that the stem 52 will extend approximately one inch downward from its resting position. When the actuator stem 52 impacts the top end 14 of any signal element, as shown in FIGS. 8-12, the impact force will cause the capsule 22 in the signal element 10 to rupture, thereby causing admixture of the two fluids therein. After impacting the flexible top end 14 of the signal device, the stem 52 further moves the base 18 of the positioned element past the resilient leaf springs 76 to allow the signal element to be dispensed from the vehicle V.

Simultaneously with the moving of the stem 52, the gate 48 attached thereto also moves in a downward blocking position so as to maintain the next light element (10B) from moving forward thereby eliminating the possibility of malfunction by jamming.

The solenoid stem then returns to its rest position by the urging of spring 78 to move the gate 48 to its at rest position to allow the next element, in this case 10B, to move to the activating position previously occupied by the element 10A. The invention is further enhanced by having the base 18 of the light element shaped with a semi-spherical bottom having a flat end 18B so that when the element falls to the ground or roadway the base 18 positions the light element in an upward position, as shown in FIG. 8, for optimum visual orientation.

The foregoing disclosure and description of the invention are illustrative and explanatory thereof, and various changes in the size, shape and materials, as well as in the details of the illustrated construction may be made without departing from the spirit of the invention.

What is claimed:

1. Apparatus adapted for use with a vehicle for dispensing and activating a signal device comprising
   a housing having an aperture,
   a disposable holder means operatively releasably connected to said housing for positioning a plurality of signal devices relative to said housing aperture, and
   means for dispensing each positioned signal device and activating a chemical reaction in the signal device to operably provide a chemiluminsecent light.

2. Apparatus of claim 1 adapted for use with an electrical power source wherein said means for dispensing, comprises
   an actuator means electrically coupled to the power source for contacting the top of the positioned signal device to activate the positioned signal device while urging the positioned signal device through said housing aperture.

3. Apparatus of claim 2 further comprising:
   a gate means disposed in said holder means for allowing the positioned signal device to be dispensed while maintaining the other signal devices; and
   means for interengaging said gate and said actuator means.

4. Apparatus of claim 1 further comprising
   a quick connect means interengaged with said housing and said holder means for positioning said plurality of signal devices.

5. Apparatus of claim 2 wherein said holder means aligns said plurality of signal devices in a row.

6. Apparatus of claim 1 wherein said holder means aligns said plurality of signal devices in a row.

7. Apparatus of claim 3 wherein said holder means aligns at least twelve signal devices in a row within the housing.

8. Apparatus of claim 1 further comprising
   a resilient means disposed adjacent to said housing aperture for resisting dispensing of said positioned signal device until the positioned signal device has been activated.

9. Apparatus of claim 7 further comprising
   a resilient means disposed adjacent to said housing aperture for resisting dispensing of said positioned signal device until the positioned signal device has been activated by the actuator means.

10. A waterproof non-flammable signal device adapted for use with an actuator means providing an impact load to an end of the signal device, comprising:
   a casing having a first flexible closed end and a second closed end,
   a semi-spherical base attached to the second end of said casing to operably position the signal device,
   a first fluid,
   a breakable capsule having said first fluid therein, one end of said breakable capsule being fixedly positioned adjacent to said flexible end of said casing, and
   a second fluid disposed in said casing and said first fluid reacting with said second fluid upon the actuator means impacting the flexible end of the casing to break said capsule to operably provide a chemiluminescent light.

11. The device of claim 10 wherein said base is weighted.

12. The device of claim 10 wherein said base is fabricated from lead.

13. The device of claim 10 wherein said first and second fluid are non-toxic.

14. The device of claim 10 wherein said first fluid is a chemiluminescent compound.

15. The device of claim 10 wherein said second fluid is a hydrogen peroxide solution and a fluorescent compound.

16. The device of claim 10 wherein said casing is fabricated from plastic.

17. Apparatus adapted for dispensing and activating a signal device and adapted for use with an electrical power source of a vehicle comprising
   a signal devices including
      a casing having a first flexible closed end and a second closed end,
      a first fluid,
      a breakable capsule having said first fluid therein being fixedly positioned at said flexible end of the casing, and
      a second fluid disposed in said casing and said first fluid reacting upon breaking of said capsule to operable provide a chemical light;
   a housing having an aperture;
   a disposable holder means for positioning a plurality of said signal devices relative to said housing aperture;
   a quick connect means interengaged with said housing and said holder means;
   an actuator means electrically coupled to the power source for contacting of the flexible end of a signal device positioned for dispensing through the aperture to activate the positioned signal device by breaking of said capsule while urging the positioned signal device through said housing aperture.

* * * * *